US 6,709,035 B1

(12) United States Patent
Namuduri et al.

(10) Patent No.: US 6,709,035 B1
(45) Date of Patent: Mar. 23, 2004

(54) EXTENDIBLE BUMPER SYSTEM AND METHOD OF CONTROL

(75) Inventors: Chandra Sekhar Namuduri, Troy, MI (US); Lawrence E. Peruski, Canton, MI (US); Gary Lee Jones, Farmington Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/324,589

(22) Filed: Dec. 19, 2002

(51) Int. Cl.[7] .............................................. B60R 19/38
(52) U.S. Cl. ........................ 293/118; 293/119; 293/132
(58) Field of Search ................................ 293/118, 119, 293/132, 24, 117; 74/509

(56) References Cited

U.S. PATENT DOCUMENTS

| | | | | |
|---|---|---|---|---|
| 1,646,055 A | * | 10/1927 | Ebaugh ....................... | 293/119 |
| 4,177,882 A | * | 12/1979 | Dowell et al. ............... | 293/132 |
| 4,518,183 A | * | 5/1985 | Lee ............................ | 293/118 |
| 4,770,453 A | * | 9/1988 | Reynolds .................... | 293/119 |
| 4,830,417 A | * | 5/1989 | Bates et al. ................. | 293/134 |
| 5,967,573 A | | 10/1999 | Wang | |
| 6,224,120 B1 | | 5/2001 | Eipper et al. | |
| 6,302,458 B1 | * | 10/2001 | Wang et al. ................. | 293/132 |
| 6,401,565 B1 | * | 6/2002 | Wang et al. ................. | 293/119 |

* cited by examiner

Primary Examiner—Dennis H. Pedder
Assistant Examiner—Patricia Engle
(74) Attorney, Agent, or Firm—Kathryn A. Marra (57) ABSTRACT

An extendible bumper system for a vehicle includes a controller system configured to: determine a distance of travel of a first end of a bumper structure using a signal from a position sensor in a first motor, determine a distance of travel of a second end of the bumper structure using a signal from a position sensor in a second motor, and independently adjust at least one of rotational speed and torque output of rotors in the first and second motors in response to the distances of travel. The rotational speed or torque output of the first and second rotors may be independently adjusted in response to a difference in the distances of travel of the first and second ends of the bumper structure, and the rotational speed or torque output of the first and second rotors may be accelerated or decelerated during predetermined distances of travel. A bumper energy absorber for supporting the bumper structure relative to a vehicle includes an inner tube, outer tube, lead screw, nut and motor. Rotation of the lead screw by the rotor causes translation of the nut along the lead screw for driving at least a portion of the bumper structure between extended and retracted positions.

27 Claims, 11 Drawing Sheets

EXTENDIBLE BUMPER SYSTEM AND METHOD OF CONTROL

BACKGROUND

The present invention relates to bumper systems for motor vehicles and, more particularly, to extendible bumper systems.

Motor vehicles typically have a bumper structure supported on a body of the motor vehicle by energy absorbers that convert into work a portion of the kinetic energy of a force on the bumper structure. Such bumper energy absorbers commonly include relatively movable structural elements attached to the body and the bumper structure and a resistance medium between the structural elements.

Extendible bumper systems include an actuator forming part of the bumper energy absorber for extending and retracting the bumper structure. Typically, these systems support the bumper structure close to the body of the motor vehicle during certain conditions, such as when the vehicle is being parked, and extend the bumper structure from the body during other conditions to increase the ability of the bumper energy absorbers to convert the kinetic energy of a force on the bumper structure into work.

SUMMARY OF THE INVENTION

In an exemplary embodiment, an extendible bumper system for a vehicle includes a controller system configured to: determine a distance of travel of a first end of a bumper structure using a signal from a position sensor in a first motor, determine a distance of travel of a second end of the bumper structure using a signal from a position sensor in a second motor, and independently adjusting at least one of rotational speed and torque generated by rotors in the first and second motors in response to the distances of travel.

In one embodiment, at least one of rotational speed and torque generated by the first and second rotors are independently adjusted in response to a difference in the distances of travel of the first and second ends of the bumper structure. In another embodiment, the rotational speeds of the first and second rotors are accelerated or decelerated during predetermined distances of travel.

In another aspect, a bumper energy absorber for supporting a bumper structure relative to a vehicle includes an outer tube is coupled to the vehicle, and an inner tube is disposed within the outer tube and coupled to the bumper structure. A lead screw is disposed within the inner tube, and a nut is threadably engaged to the lead screw. The inner tube is coupled to the nut. Fixed relative to the outer tube is a motor, which has its rotor coupled to the lead screw. Rotation of the lead screw by the rotor causes translation of the nut along the lead screw for driving at least a portion of the bumper structure between extended and retracted positions.

BRIEF DESCRIPTION OF THE DRAWINGS

Referring to the exemplary drawings wherein like elements are numbered alike in the several Figures.

DETAILED DESCRIPTION

Figure 1:
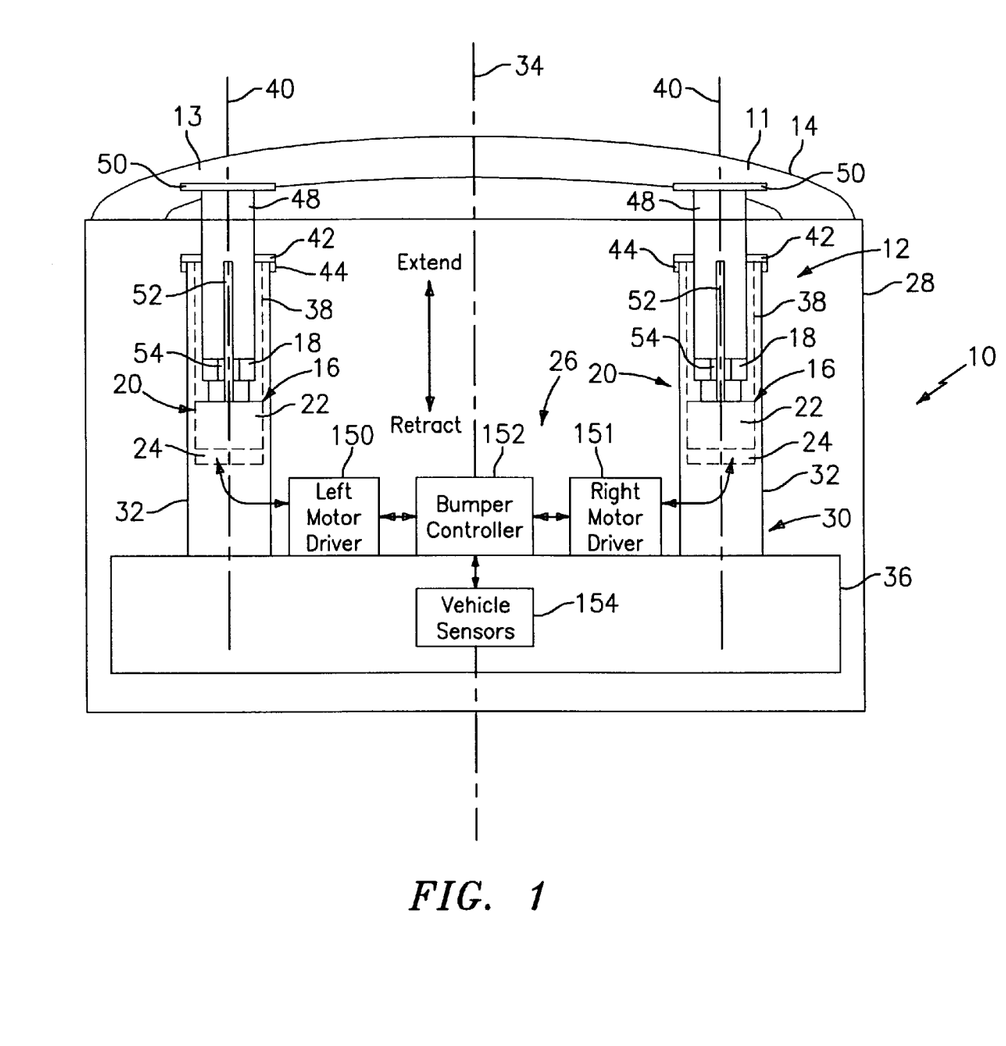
FIG. 1 is a schematic view of an extendible bumper system having a bumper structure supported in a retracted position.
Figure 2:
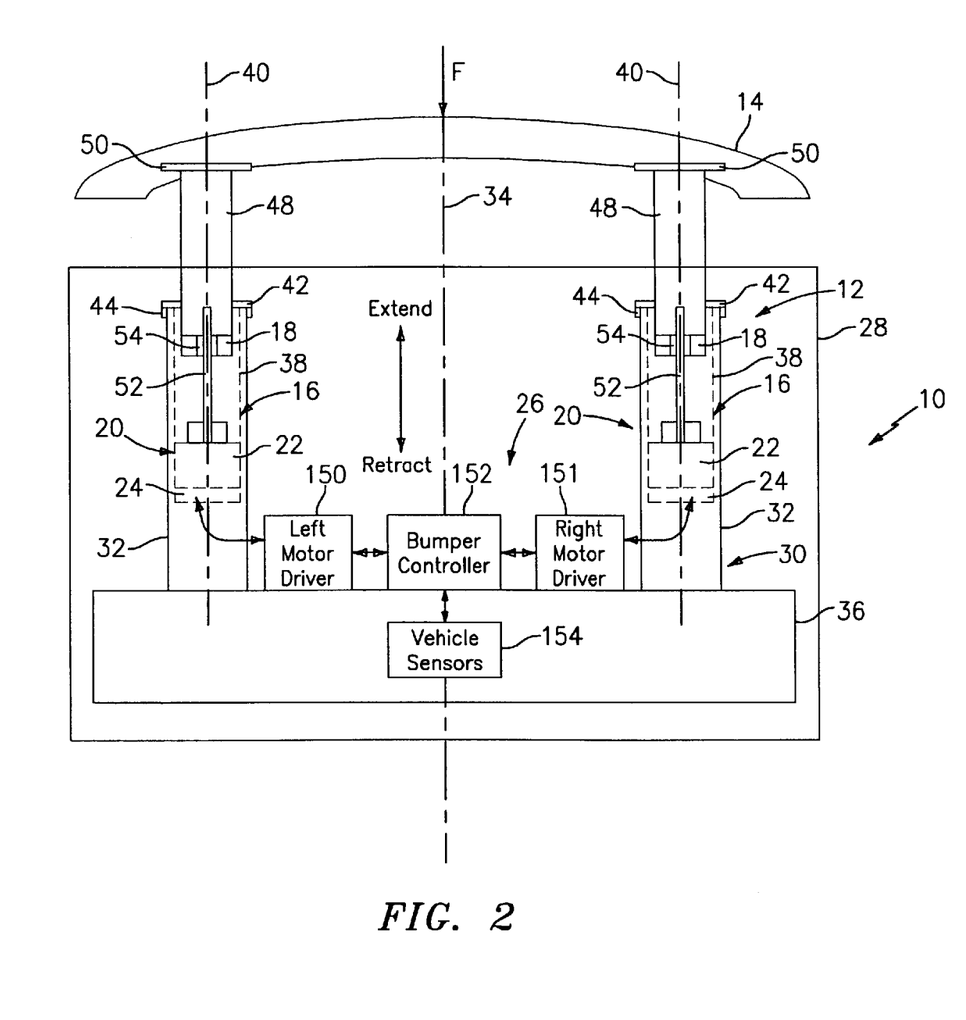
FIG. 2 is a schematic view of the extendible bumper system of FIG. 1 having the bumper structure supported in an extended position.

Referring to FIGS. 1 and 2, a schematic view of a portion of a vehicle 10 including an extendible bumper system 12 is shown. Extendible bumper system 10 includes a bumper structure 14 supported at its ends 11 and 13 by bumper energy absorbers 16, which move the bumper structure 14 between a retracted position, as shown in FIG. 1, and an extended position, as shown in FIG. 2. Each bumper energy absorber 16 includes a linear actuator 20 driven by an electric motor 22, which includes an integrated position sensor 24. A controller system 26 in vehicle 10 employs a method of controlling the actuators 20 in response to position signals provided by the position sensors 24. The method ensures symmetrical extension or retraction on both ends 11 and 13 of the bumper structure 14 and eliminates the noise and vibration associated with the abrupt extension and retraction of the bumper energy absorbers 16 and bumper structure 14.

Vehicle 10 includes a body portion 28 attached to or integral with a frame portion 30. The frame portion 30 includes a pair of hollow frame rails 32 extending parallel to a longitudinal centerline 34 of the vehicle 10 and rigidly interconnected by a cross member 36. Disposed within each hollow frame rail 32 is a bumper energy absorber 16.

Each bumper energy absorber 16 includes a cylindrical outer tube 38 having a longitudinal centerline 40 parallel to the longitudinal centerline 34 of the motor vehicle 10. While the outer tube 38 is described herein as a cylinder, the outer tube 38 may have any convenient cross sectional shape. Coupled to an end of outer tube 38 is a flange 42, which extends radially outward from the outer tube 38 proximate an open end of frame rail 32. Flange 42 is secured to a flange 44 extending radially outward around a perimeter of the open end of frame rail 32 such that the outer tube 38 is rigidly coupled to the frame rail 32. While bumper energy absorber 16 is described herein as being disposed within the hollow frame rail 32, other rigid attachments between the body portion 28 or frame portion 30 and the outer tube 38 may be substituted.

In each bumper energy absorber 16, an inner tube 48 is supported within the outer tube 38 for back and forth linear translation in the direction of the longitudinal centerline 40 of the outer tube 38. The cross sectional shape of the inner tube 48 preferably matches the cross sectional shape of the outer tube 38. An end of the inner tube 48 is secured to a bumper interface flange 50, which is attached to the bumper structure 14 so that the inner tube 48 and the bumper structure 14 are supported on the vehicle 10 through the outer tube 38 and frame rail 32.

Each linear actuator 20 includes a motor 22 rigidly secured to an end of the outer tube 38, and a threaded lead screw 52 coupled to the motor 22 and having its longitudinal centerline aligned with the longitudinal centerline 40 of the outer tube 38. Each linear actuator 20 also includes a nut 54 threadably engaged with the lead screw 52. The nut 54 is secured to a self-locking mechanism 18, which is, in turn, secured to the inner tube 48. Rotation of the lead screw 52 by the motor 22 causes translation of the nut 54 along the lead screw 52, which causes translation of the self-locking mechanism 18 and inner tube 48 between the retracted position shown in FIG. 1 and the extended position shown in FIG. 2. In its retracted and extended positions, bumper structure 14 is close to the body portion 28 and more remote from the body portion 28, respectively. The self-locking mechanism 18 allows inner tube 48 to extend or retract freely within the outer tube 38 under the force applied by the lead screw 52, and provides a mechanical resistance between the inner tube 48 and the outer tube 38 in response to a force applied to the bumper structure in the direction indicated at F in FIG. 2. The mechanical resistance resists translation of the inner tube 48 relative to the outer tube 38, thereby directing at least a portion of the force F from the inner tube 48 to the outer tube 38.

Figure 3:
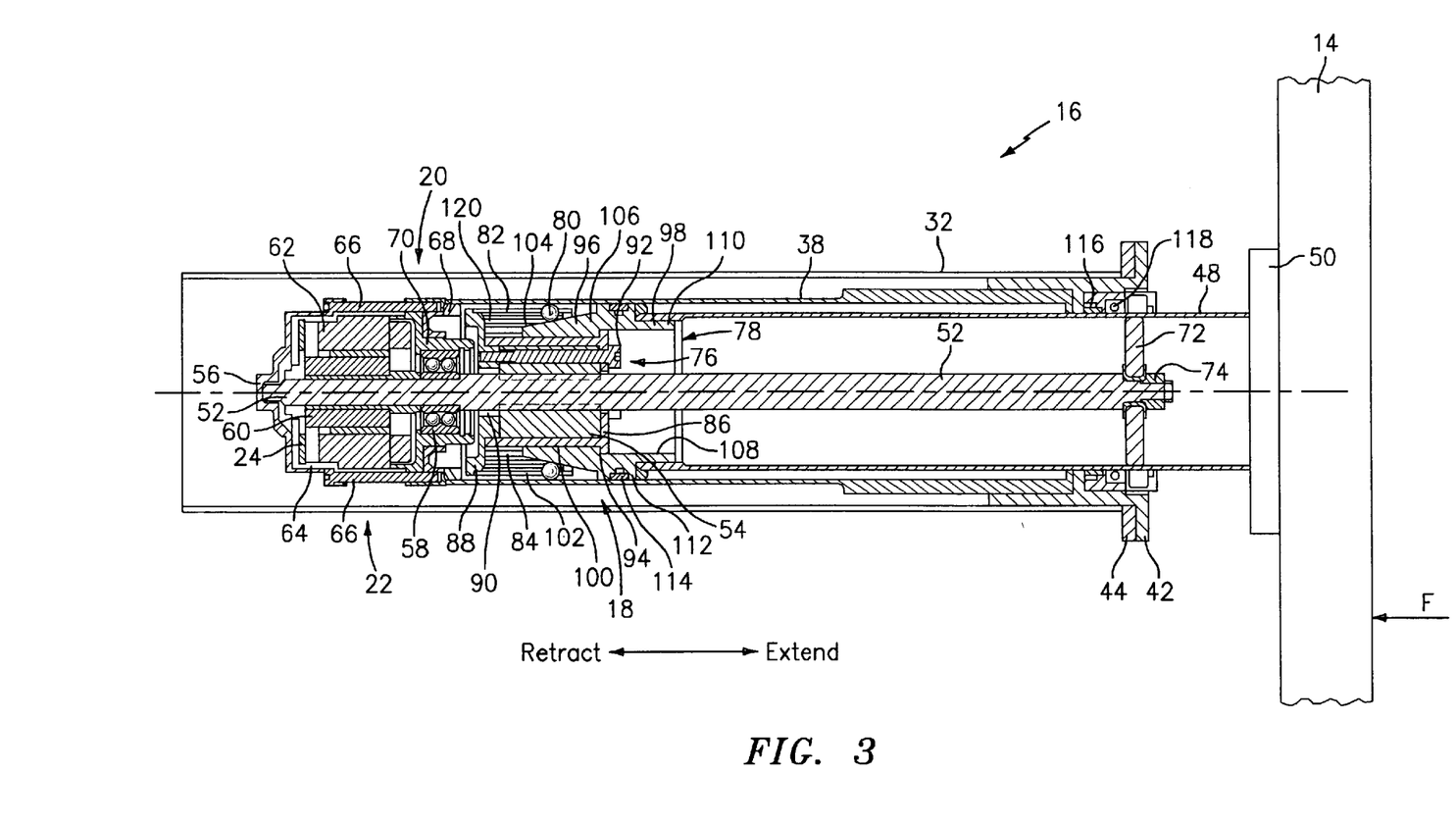
FIG. 3 is a cross-sectional view of a linearly actuated bumper energy absorber.

FIG. 3 provides a detailed cross-sectional view of the bumper energy absorber 16. In the embodiment shown, motor 22 is a direct current (DC), brushless motor including: a hollow, cylindrical, permanent magnet (PM) rotor 60 through which a non-threaded end of lead screw 52 extends; a stator 62 disposed around the rotor 60; ball bearings 58 through which the non threaded end of lead screw 52 extends; and rotor position sensor 24, which will be described in further detail hereinafter. A housing 64 of motor 22 is secured to outer tube 38 by bolts 66, which extend through apertures disposed in the housing 64 and are received by threaded holes in a flange 68 secured to an end of outer tube 38. Flange 68 extends radially inward from the outer tube 38, and is shaped to provide support to a bearing end cap portion 70 of the housing 64.

Secured within the end cap portion 70 of housing 64 is the ball bearing 58 through which a portion of the lead screw 52 extends. The non-threaded end of the lead screw 52 ends in sleeve bearing 56, which is secured within the end cap portion of housing 64. Lead screw 52 is axially aligned with, and coupled to, the rotor 60 such that the rotor 60 and lead screw 52 rotate as one. An opposite end of lead screw 52 extends through the center of a disk shaped guide washer 72, and is secured to the guide washer 72 by a nut 74 threadably engaged with the end of the lead screw 52. Guide washer 72 maintains coaxial alignment between the lead screw 52 and the inner tube 48.

Threadably engaged to the lead screw 52 is nut 54, which is secured to the self-locking mechanism 18. Nut 54 is a cylindrical structure having threads formed on an inner surface to engage threads formed on the lead screw 52.

In the embodiment shown, self-locking mechanism 18 includes an actuator plate assembly 76 disposed within a shuttle 78. Shuttle 78 supports a plurality of spheres 80, which are maintained in an evenly spaced relationship around an outer surface of the shuttle 78 by a slotted cylinder 82. While one embodiment of self-locking mechanism 18 is described in detail herein, it will be recognized that other self-locking mechanisms may be alternatively employed. For example, the self-locking mechanisms described in U.S. Pat. No. 5,976,573 entitled "Bumper Energy Absorber" may be employed.

Actuator plate assembly 76 includes a cylindrical tube 84 disposed around the nut 54 and having a flange 86 that extends radially inward from the cylindrical tube and along one end of nut 54. Actuator plate assembly 76 also includes a circular actuator plate 88 extending along the opposite end of nut 54. Disposed through the center of actuator plate 88 is an aperture 90 through which lead screw 52 freely extends. One or more fasteners 92 extend through apertures formed in flange 86 and nut 54, and are threadably engaged to actuator plate 88 to secure the actuator plate assembly 76 to the nut 54. Flange 86 also extends radially outward from the cylindrical tube 84 for interacting with a land 94 formed on the shuttle 78.

Shuttle 78 is a tubular structure including a ramp portion 96 and a coupling and alignment portion 98 formed thereon. Ramp portion 96 has a cylindrical inside surface 100 and a cone shaped outside surface 102. The taper of the cone shaped outside surface 102 is selected such that the balls 80, which are maintained in contact the surface 102, provide little or no resistance to the relative motion of the inner and outer tubes 48 and 38 when the balls 80 are positioned proximate a circumferentially narrow end 104 of ramp portion 96, and such that the balls 80 provide a greater resistance to the relative motion of the inner and outer tubes 48 and 38 when the balls 80 are positioned proximate a circumferentially wide end 106 of ramp portion 96.

The coupling and alignment portion 98 of the shuttle 78 has a cylindrical inside surface 108 of greater diameter than the inside surface 100 of the ramp portion 96. The land 94 is created at the transition between the inside surfaces 108 and 100. A cylindrical outside surface 110 of the coupling and alignment portion 98 includes a boss 112 extending radially about its circumference and positioned proximate the circumferentially wide end 106 of the ramp portion 96. Outside surface 110 is received within inner tube 48, which is secured to boss 112 by fasteners, welding, or the like. Disposed in a slot formed around the circumference of boss 112 is a ring 114, which contacts the inside surface of outer tube 38 for axially aligning the shuttle 78 and inner tube 48 with the outer tube 38. Axial alignment between the inner and outer tubes 48 and 38 is further maintained by a ring 116 disposed in a slot formed in an inner surface the frame interface flange 42. Ring 116 contacts the outer surface of inner tube 48. Also installed in the frame interface flange 42 proximate ring 116 is a sealing ring 118, which wipes moisture and debris from the outer surface of inner tube 48 and prevents the moisture and debris from entering the outer tube 38.

Spheres 80 are evenly spaced around the circumference of the outer surface 102 of ramp portion 96. The even spacing of the spheres 80 is maintained by the slotted cylinder 82, which is coupled to the perimeter of the actuator plate 88. Each sphere 80 is disposed within its own slot 120 formed in the cylinder 82.

Figure 4:
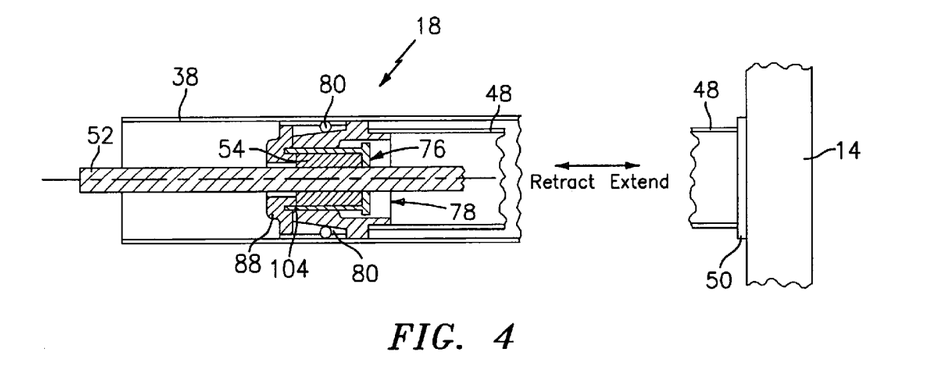
FIG. 4 is a cross-sectional view of a self-locking mechanism for the linearly actuated bumper energy absorber during motion in the extend direction.

In FIG. 3, inner tube 48 is shown in a fully retracted position. To move inner tube 48 to an extended position, motor 22 is operated such that rotor 60 and lead screw 52 rotate in a first direction (e.g., clockwise). Rotation of lead screw 52 drives nut 54 and actuator plate assembly 76 in the extend direction. Shuttle 78 remains stationary until actuator plate 88 contacts the circumferentially narrow end 104 of shuttle 78, as shown in FIG. 4, at which point the force applied by nut 54 through actuator plate 88 drives shuttle 78 and inner tube 48 in the extend direction. The bumper structure 14, which is secured to inner tube 48 via the bumper interface flange 50, is driven in the extend direction by the inner tube 48. Motion of the shuttle 78 in the extend direction forces balls 80 toward the circumferentially narrow end 104 of shuttle 78, allowing the inner tube 48 to move relative to the outer tube 38. The bumper structure 14 is driven in the extend direction by the inner tube 48 until the bumper structure 14 reaches its fully extended position, at which point the rotation of the rotor 60 and lead screw 52 is stopped.

With the self-locking mechanism 18 in the extended position, a force F on the bumper structure 14 will be translated through inner tube 48 to shuttle 78, moving the shuttle 78 in the retract direction with respect to the outer tube 38. Motion of the shuttle 78 in the retract direction under the force F causes balls 80 to ride up the cone shaped outer surface 102 where they are wedged between the cone shaped outer surface 102 and the inner surface of the outer tube 38, shunting at least a portion of the force F from inner tube 48 to outer tube 38 and, in turn, to the frame portion 30 of the vehicle 10 (FIG. 1).

Figure 5:
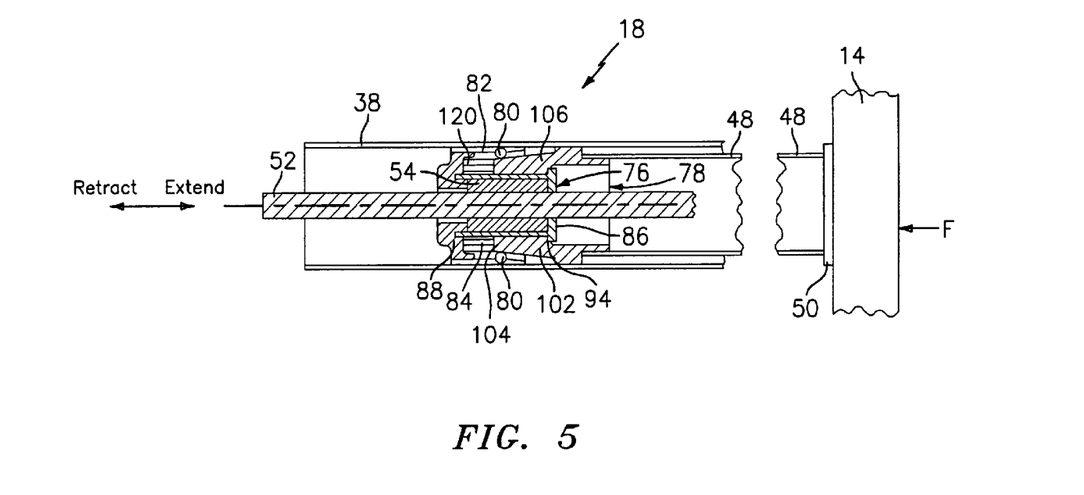
FIG. 5 is a cross-sectional view of the self-locking mechanism during motion in the retract direction.

To move inner tube 48 to a retracted position, motor 22 is operated such that rotor 60 and lead screw 52 rotate in the second direction (e.g., counter clockwise). Rotation of lead screw 52 drives nut 54 and actuator plate assembly 76 in the retract direction. Nut 54, actuator plate assembly 76, and slotted cylinder 82 move relative to ramp portion. As the slotted cylinder 82 moves in the retract direction, the balls 80 are drawn towards the circumferentially narrow end 104 of shuttle 78 by ends of the slots 120, where the balls 80 will provide little or no resistance to the relative motion of inner and outer tubes 48 and 38. Shuttle 78 remains stationary until the flange 86 on the actuator plate assembly 76 contacts land 94 on shuttle 78, as shown in FIG. 5, at which point the force applied by nut 54 through flange 86 drives shuttle 78 and inner tube 48 in the retract direction. The bumper structure 14 is driven in the retract direction by the inner tube 48 until the bumper structure 14 reaches its fully retracted position, as shown in FIG. 3, at which point the rotation of the rotor 60 and lead screw 52 is stopped.

Referring again to FIG. 1, operation of the motors 22 to extend and retract the bumper structure 14 is controlled by the controller system 26. Controller system 26 includes left and right motor drivers 150 and 151, which each receive rotor position sensor signals from an associated rotor position sensor 24 and provide appropriate voltages to the associated motor 22 to produce the desired motion of the lead screw 52 and bumper structure 14. Controller system 26 also includes a bumper controller 152, which receives rotor position pulses from the motor drivers 150 and 151 and outputs voltage, current, and direction commands to the motor drivers 150 and 151. Bumper controller 152 is connected to various sensors 154 in the vehicle 10.

Sensors 154 obtain various parameters from vehicle 10 such as gear position (Park-Reverse-Neutral-Drive), vehicle speed, obstacle range, obstacle range approach rate, hard braking, anti-lock braking system activation, etc., which are used by bumper controller 152 to determine the appropriate position of bumper structure 14. For example, during lower speed operation, the bumper structure 14 may be fully retracted for providing a short front end look to the vehicle 10 and for providing ease of parking due to short overall vehicle length. At higher vehicle 10 operating speeds, the bumper structure 14 may be filly extended, as shown in FIG. 2, to increase the ability of the bumper energy absorbers 16 to convert the kinetic energy of a force F on the bumper structure 14 into work.

In response to detecting a condition requiring bumper extension or retraction, the bumper controller 152 sends suitable commands to both motor drivers 150 and 151 to extend or retract the bumper structure 14 at a pre-determined speed. While the motor drivers 150 and 151 and actuators 20 are operating to extend or retract the bumper structure 14, the bumper controller 152 monitors the rotor position pulses to determine the positions of the ends 11 and 13 of the bumper structure 14 and independently adjusts at least one of the rotational speed and torque output of each motor 22 in response to these positions. Bumper controller 152 adjusts the speed and/or torque of each motor 22 to ensure symmetrical extension or retraction on both ends 11 and 13 of the bumper structure 14 and to reduce the noise associated with the abrupt extension and retraction of the bumper energy absorbers 16. Symmetrical extension and retraction of the bumper energy absorbers 16 prevents binding of the bumper energy absorbers 16 as they move between the extended and retracted positions.

Figure 6:
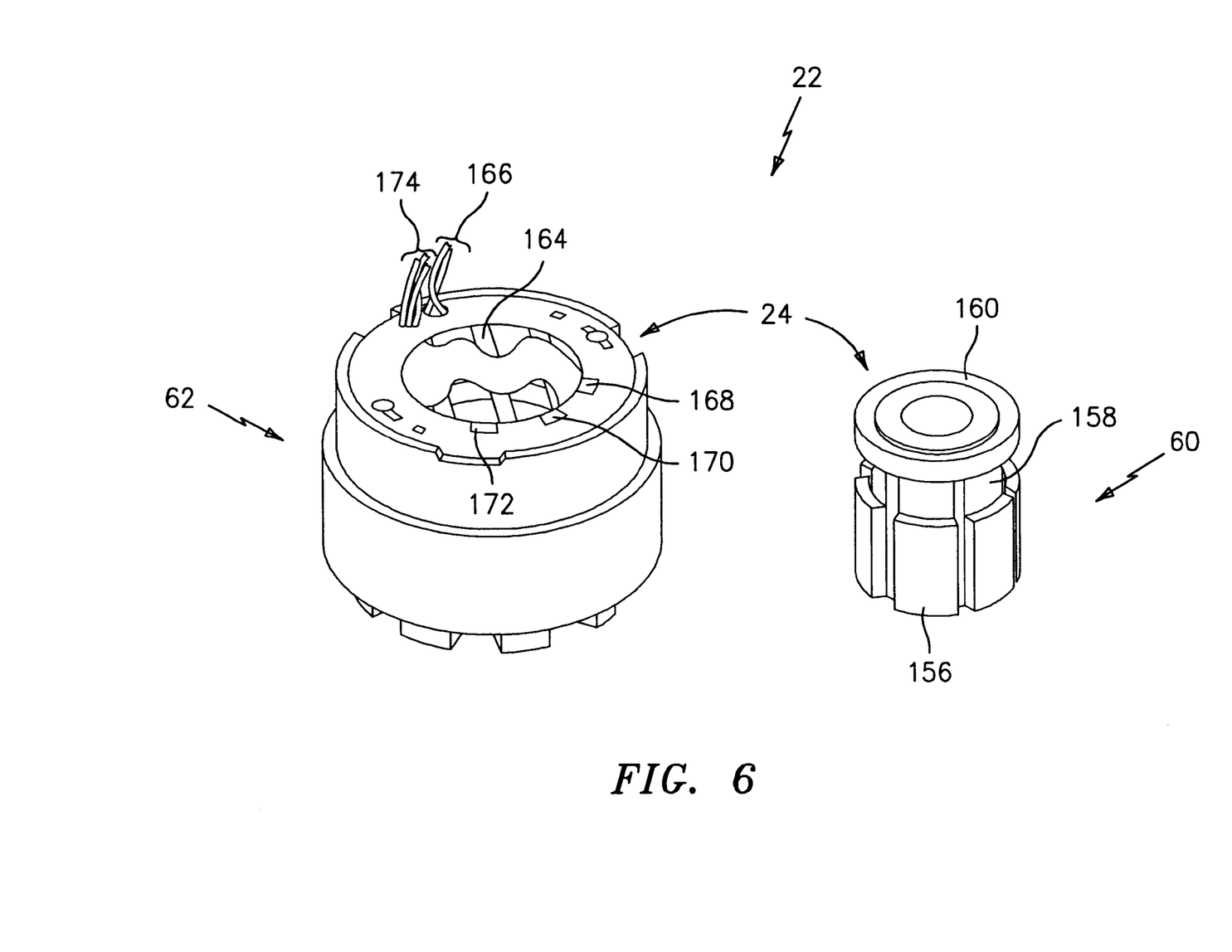
FIG. 6 is a perspective view of a portion of a motor for the bumper energy absorber.

Referring to FIG. 6, the rotor 60 of motor 22 is shown removed from the stator 62, revealing the rotor position sensor 24. In the embodiment described herein, motor 22 is a DC, PM, three phase, brushless motor. The rotor 60 includes permanent magnets 156 evenly spaced around a hollow cylindrical body 158 and forming the poles of the rotor 60. A sensor magnet ring 160 is disposed around one end of the body 158. The sensor magnet ring 160 includes a number of magnetic poles equal to, and positioned in relationship to, the rotor poles.

Figure 7:
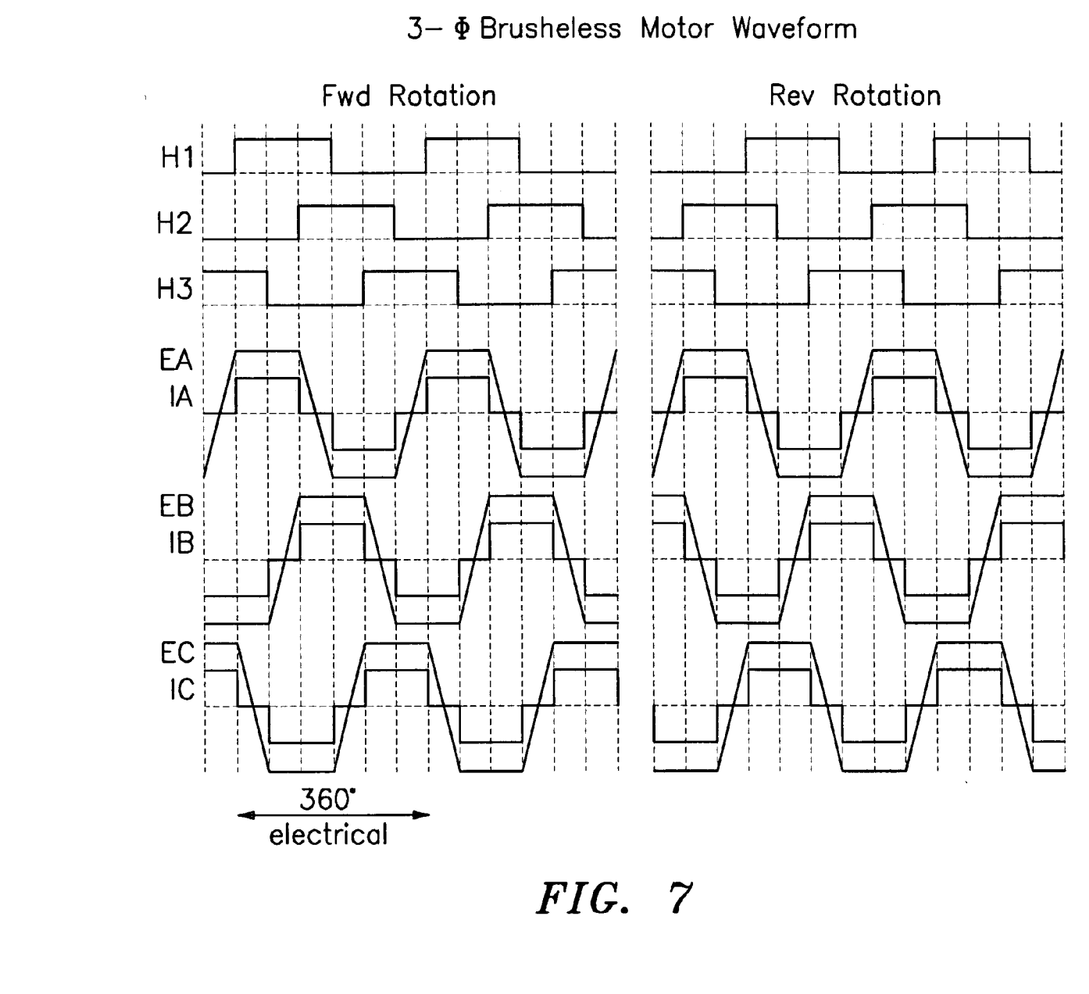
FIG. 7 is a graph of three phase waveforms indicating the timing of position sensor signals output by a position sensor in the motor for the bumper energy absorber, and current waveforms input to the motor, with respect to motor phase voltages.

Stator 62 includes three phase windings 164 that receive current signals 1A, 1B, and 1C via winding leads 166. Attached to the stator 62 is a set of three Hall effect sensors 168, 170, and 172. Hall effect sensors 168, 170, and 172 sense the position of the rotor 60 by sensing the magnetic field of the poles in the sensor magnet ring 160. Each sensor 168, 170, and 172 produces a rotor position sensor signal H1, H2, and H3, respectively, which is a square wave signal with a rising edge and a falling edge per pole pair on the rotor 60, as indicated in FIG. 7. The three Hall effect sensors 168, 170, and 172 are positioned to obtain a phase displacement of 120 electrical degrees between the leading edges of the adjacent rotor position sensor output signals H1-H2, H2-H3, and H3-H1. The rotor position sensor signals H1, H2, and H3 from each sensor 168, 170, and 172 are output to the associated motor driver 150 or 151 (FIG. 1) via sensor wires 174.

Figure 8:
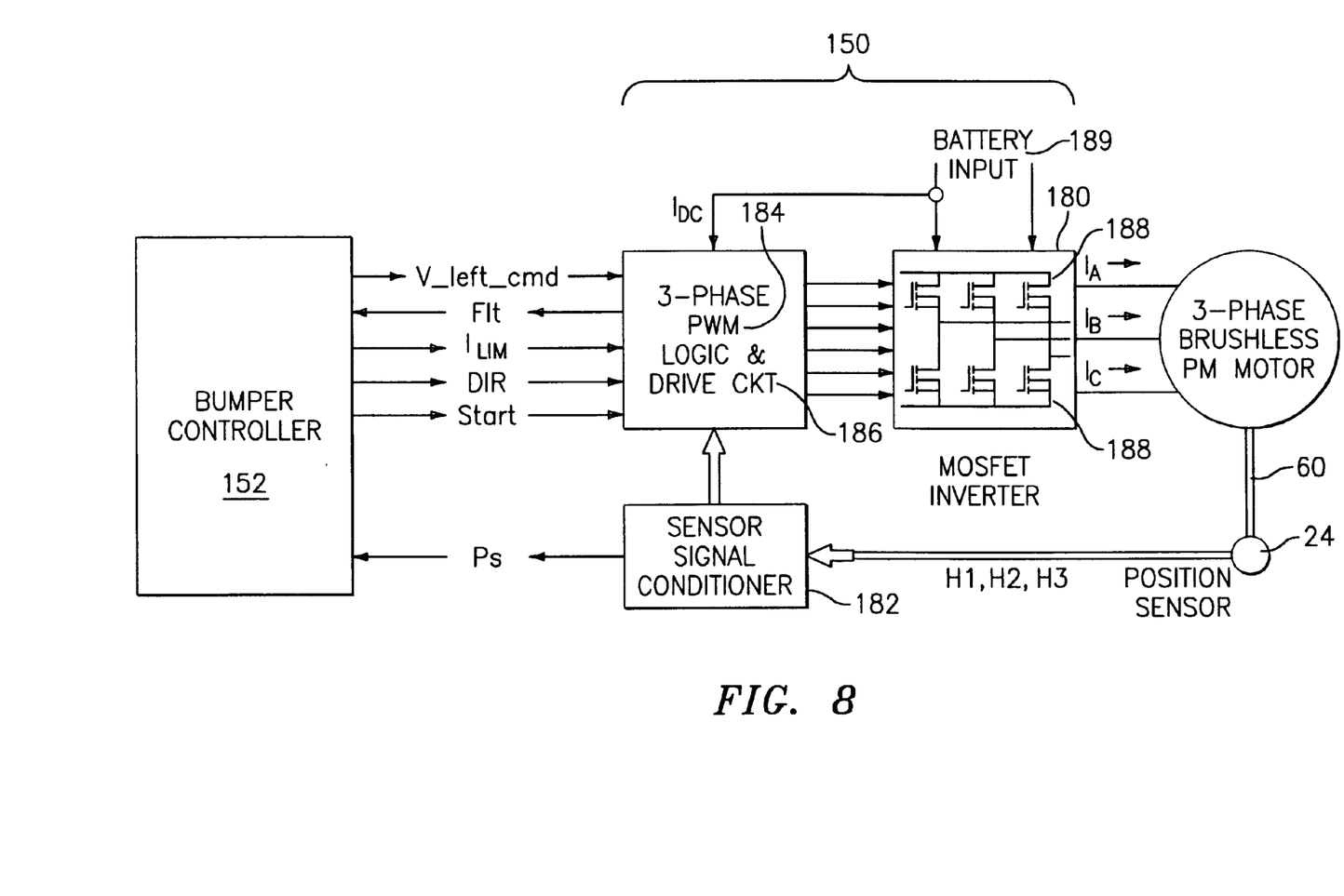
FIG. 8 is a motor driver for the extendible bumper system.

Referring to FIG. 8, an exemplary embodiment of the motor driver 150 is shown. While motor driver 150 is described here, motor driver 151 is similarly configured. In general, motor driver 150 receives rotor position sensor signals H1, H2, and H3 from rotor position sensor 24 and applies these signals to perform two functions: 1) to time the output of current waveforms IA, IB, IC to the brushless motor 22 for ensuring proper rotor 60 rotation and torque output, and 2) to generate a position pulse Ps for use by the bumper controller 152 in determining bumper structure 14 position. The motor driver 150 also receives voltage and direction commands from the bumper controller 152. In response to receiving these commands, the motor driver 150 provides appropriate voltages to the motor 22 to produce the desired speed, torque and direction of rotor 60 rotation and, thereby, the desired speed of bumper structure extension or retraction.

The motor driver 150 includes a three-phase, full bridge MOSFET inverter 180, a position sensor signal conditioner 182, and three-phase pulse width modulation (PWM) logic and MOSFET drive circuits 184, 186. In the embodiment shown, the three-phase PWM logic and MOSFET drive circuits 184, 186 may be implemented in a control chip, such as, for example, the model UC3625 control chip commercially available from Texas Instruments, Inc. The three-phase PWM logic circuit 184 receives signals indicating a voltage command "V_left_cmd" ("V_right_cmd for motor driver 151), motor current limit command "Ilim", motor start command "Start", and motor direction command "DIR" from the bumper controller 152. The three-phase PWM logic circuit 184 also receives sensor output signals H1, H2, and H3 from rotor position sensor 24 via sensor signal conditioner 182. The 3-phase PWM logic circuit 184 may be configured to provide a fault diagnostic signal, Flt, to the bumper controller 152.

Using the voltage command V_left_cmd, direction command DIR and the rotor position sensor signals H1, H2, and H3, the PWM logic circuit 184 determines which inverter switches 188 in MOSFET inverter 180 are to be turned ON and the duration for which they stay ON. The MOSFET drive circuit 186 provides an interface between the PWM logic circuit 184 and MOSFET inverter 180 to turn ON the appropriate inverter switches 188. In response to activation of the various inverter switches 188, MOSFET inverter 180 outputs the current signals IA, IB, and IC that induce forward or reverse rotation of the rotor 60 in motor 22. DC power to the MOSFET inverter 180 and 3-phase PWM logic and MOSFET drive circuits 184, 186 is provided by a vehicle battery 189.

Referring to FIGS. 7 and 8, the 3-phase waveforms shown in FIG. 7 indicate the timing of position sensor signals H1, H2 and H3 and current waveforms IA, IB, IC with respect to the motor phase voltages EA, EB, and EC in forward and reverse directions. The direction of rotation, forward or reverse, is set by the PWM logic circuit 184 in response to the DIR command, which is either voltage high or voltage low to indicate forward or reverse rotation. Rotation is initiated by the PWM logic circuit 184 in response to receiving the "Start" command. As can be seen in FIG. 7, to generate smooth torque, the 3-phase PWM logic and MOSFET drive circuits 184, 186 control the phase currents IA, IB, and IC output by MOSFET inverter 180 such that the phase currents are synchronized to the back electromagnetic force of the phase windings 164. The rising edge of sensor signals H1, H2 and H3 are aligned with the positive zero crossings of the stator induced voltages E(A-C), E(B-A) and E(C-B) in the a-b-c order, respectively, when the rotor 60 is rotating. The 3-phase PWM logic and MOSFET drive circuits 184, 186 control the MOSFET inverter 180 such that the speed and/or torque of motor 22 is proportional to a value indicated by the voltage command V_left_cmd. In addition, the 3-phase PWM logic and MOSFET drive circuits 184, 186 control the MOSFET inverter 180 such that the output currents IA, IB, and IC do not exceed the value indicated by the Ilim command. The voltage command, in effect, controls at least one of the speed at which the rotor 60 in motor 22 rotates and the torque output by the motor 22, and the Ilim command provides motor protection.

Figure 9:
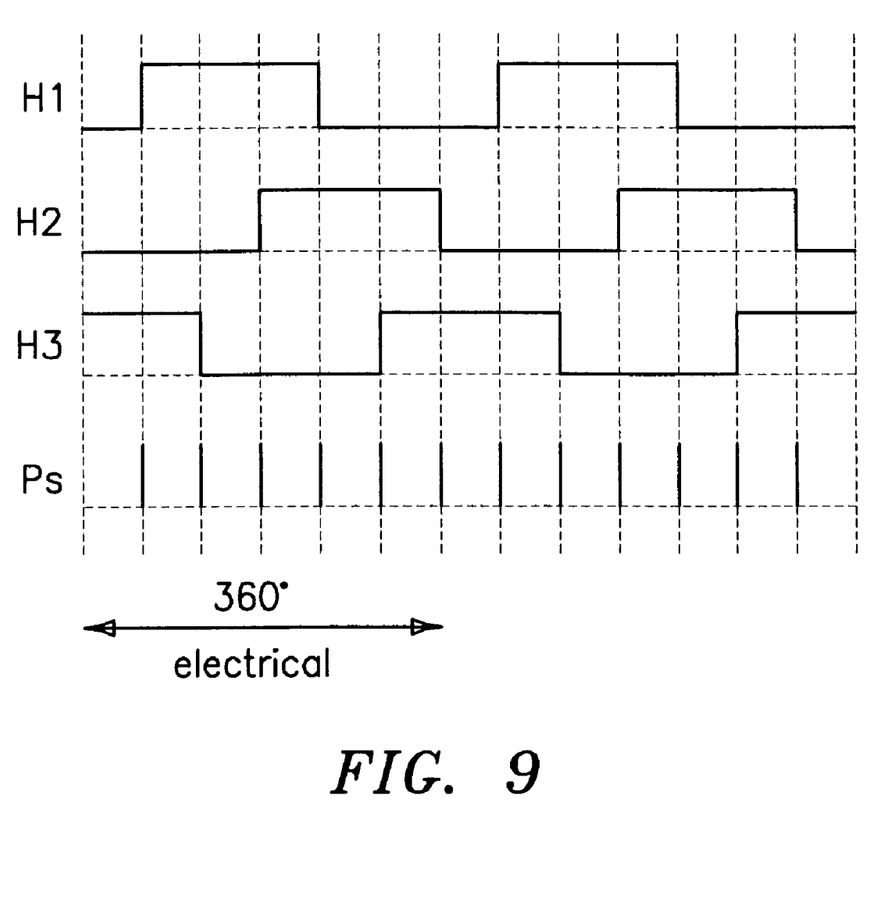
FIG. 9 is a graph indicating the coordination of position pulses output by the motor driver with respect to the position sensor signals output by the position sensor in the motor of the bumper energy absorber.

Position sensor signal conditioner 182, shown in FIG. 8, receives rotor position sensor output signals H1, H2, and H3, from position sensor 24 on motor 22 and provides these signals, or signals indicative thereof, to the three-phase PWM logic circuit 184. The position sensor signal conditioner 182 also outputs a series of position pulses "Ps" to the bumper controller 152. As shown in FIG. 9, the sensor signal conditioning circuit 182 generates a position pulse Ps at each transition of the three sensor signals H1, H2, H3. Thus, for a motor with Np poles, the number of edges and position pulses output by sensor signal conditioning circuit 182 per mechanical revolution of rotor 60 is equal to 3*Np.

Figure 10:
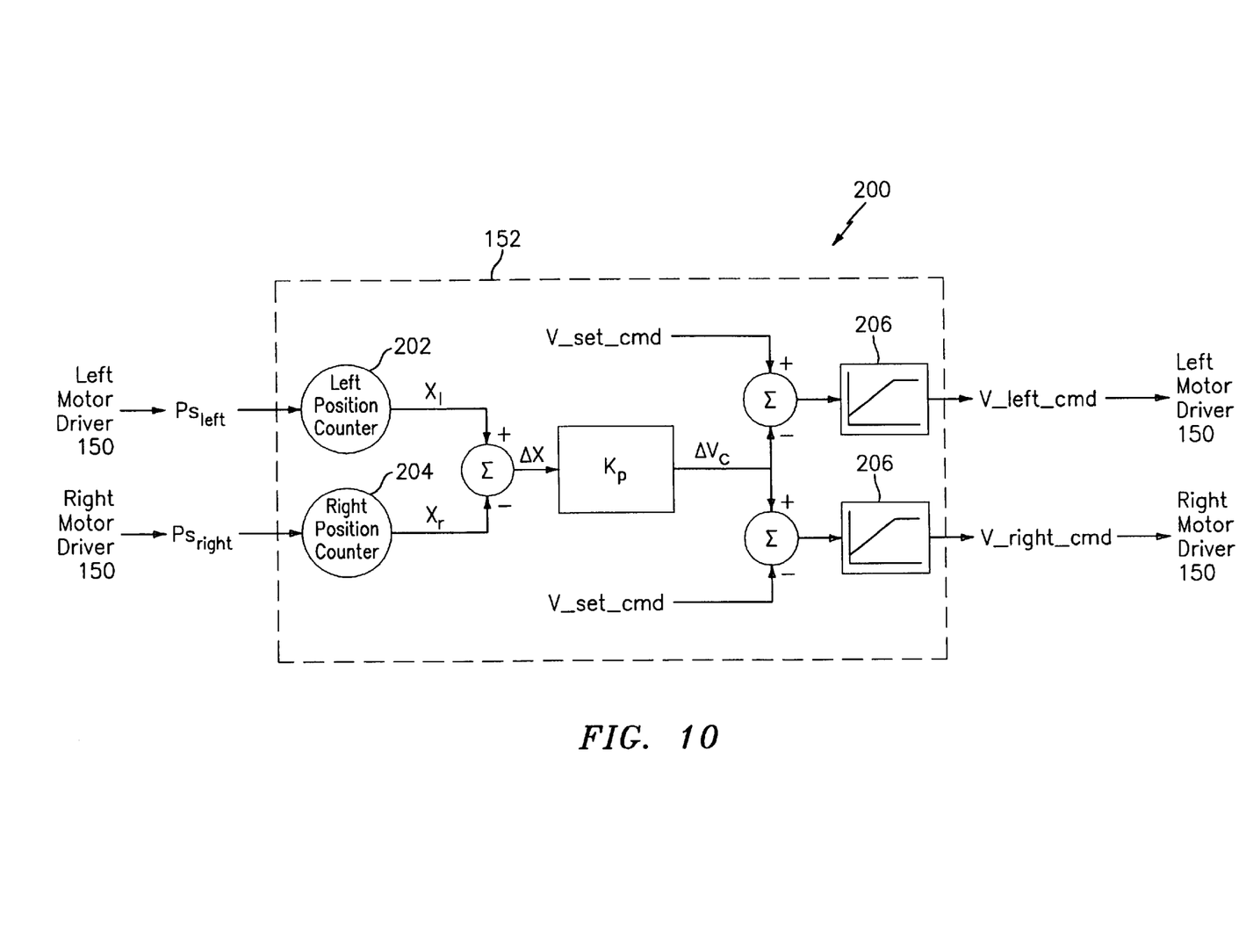
FIG. 10 is a control scheme for a bumper controller in the extendible bumper system.

Referring to FIG. 10, a control logic 200 employed by the bumper controller 152 in determining the voltage commands V_left_cmd and V_right_cmd to be sent to each of the left and right motor drivers 150 and 151 is shown. The bumper controller 152 receives the position pulses $Ps_{left}$ and $Ps_{right}$ from each of the left and right motor drivers 150 and 151, respectively. Left and right position counters 202, 204 count the position pulses from their respective motor driver 150 and determine the distance of travel of the nut 54 on each rotor driven lead screw 52 and, thereby, determine the distance of travel of each end 11 and 13 of bumper structure 14. For a lead screw 52 with a pitch of L inches-per-revolution, the resolution R of the sensor signal is: L/(3*Np) inches per pulse. As an example, with L=0.5 inches, Np=6 poles, the distance between consecutive pulses in signal Ps is 0.5/18=0.02778 inches. Thus, the distance of travel can be calculated by multiplying the number of pulses by the resolution R. The output of the left and right position counters 202, 204 are the distances Xl and Xr that each left and right actuator 20, and thus each end 11 and 13 of bumper structure 14, has traveled, respectively.

These distances Xl and Xr are input into control logic 200, which calculates the voltage commands V_left_cmd and V_right_cmd for input to the left and right motor drivers 150 and 151, respectively. The voltage (speed/torque) commands sent to the left and right motor drivers 150 and 151 are calculated as:

$$V\_left\_cmd = V\_set\_cmd - Kp*(X), \text{ and}$$

$$V\_right\_cmd = V\_set\_cmd + Kp*(X),$$

where:
 Kp is a compensation gain;
 V_set_cmd is the nominal set command level for both motor drivers 150; and $$X = Xl - Xr.$$

While a compensation gain Kp is used here, a more complex control function such as, for example, proportional and integral control gains, may also be used. The nominal set command level V_set_cmd is varied depending on the travel of the actuators 20 and bumper structure 14, and may be set independently for extension and retraction.

Figure 11:
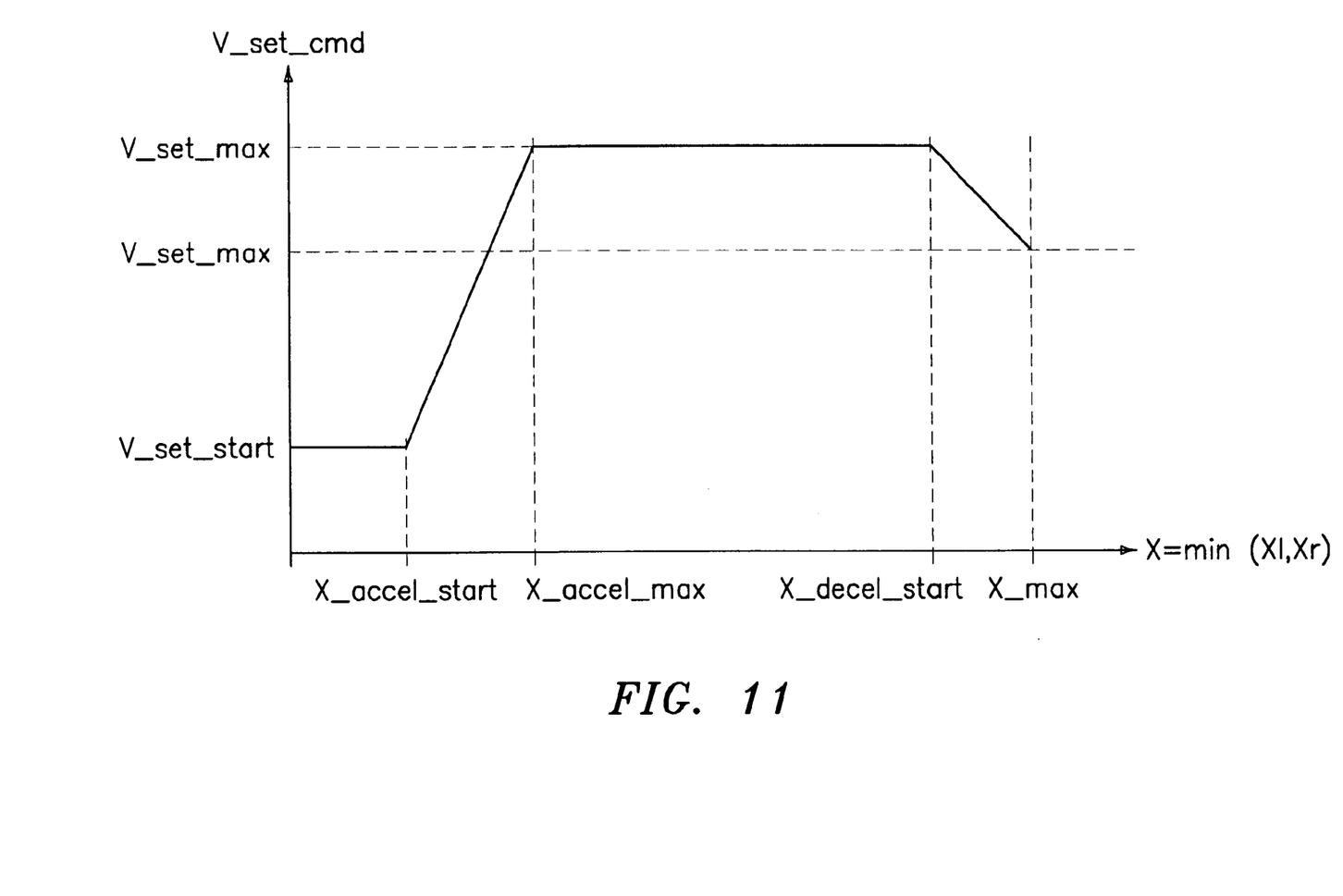
FIG. 11 is a graph depicting nominal set voltage as a function of actuator travel for the control scheme of FIG. 10.

Referring to FIG. 11, V_set_cmd is shown as a function of the minimum of Xl and Xr. As can be seen in FIG. 11, V_set_cmd begins at a minimum level, V_set_start, to overcome friction and enable the actuators 20 to start moving. Once the actuators 20 move a minimum predetermined distance (X_accel_start), V_set_cmd is ramped to a final set value, V_set_max, at a predetermined position X_accel_max, and then held there until a predetermined position near the end of travel, X_decel_start, is reached. From X_decel_start, V_set_cmd is reduced at a predetermined rate until the end of travel X_max is reached, at which point V_set_cmd is set to zero to stop the travel of the actuators 20. The bumper controller 152 may also apply a saturation function 206 to limit the maximum values of commands V_left_cmd and V_right_cmd to predetermined values in case they tend to exceed the limit of the motor driver 150 input. Ramping V_set_cmd over a predetermined distance near the beginning of bumper structure 14 travel causes the rotational speed of rotors 60 to gradually accelerate over this predetermined distance. Similarly, decreasing V_set_cmd over a predetermined distance near the end of bumper structure 14 travel gradually decelerates the rotational speed of rotors 60 over this predetermined distance. Gradually accelerating rotors 60 near the beginning of travel and gradually decelerating rotors 60 near the end of travel results in a corresponding gradual acceleration and deceleration of the actuators 20, and bumper structure 14, thus eliminating the noise and vibration that would be caused by the impact of abruptly starting and stopping actuator 20 and bumper structure 14 movement.

Figure 12:
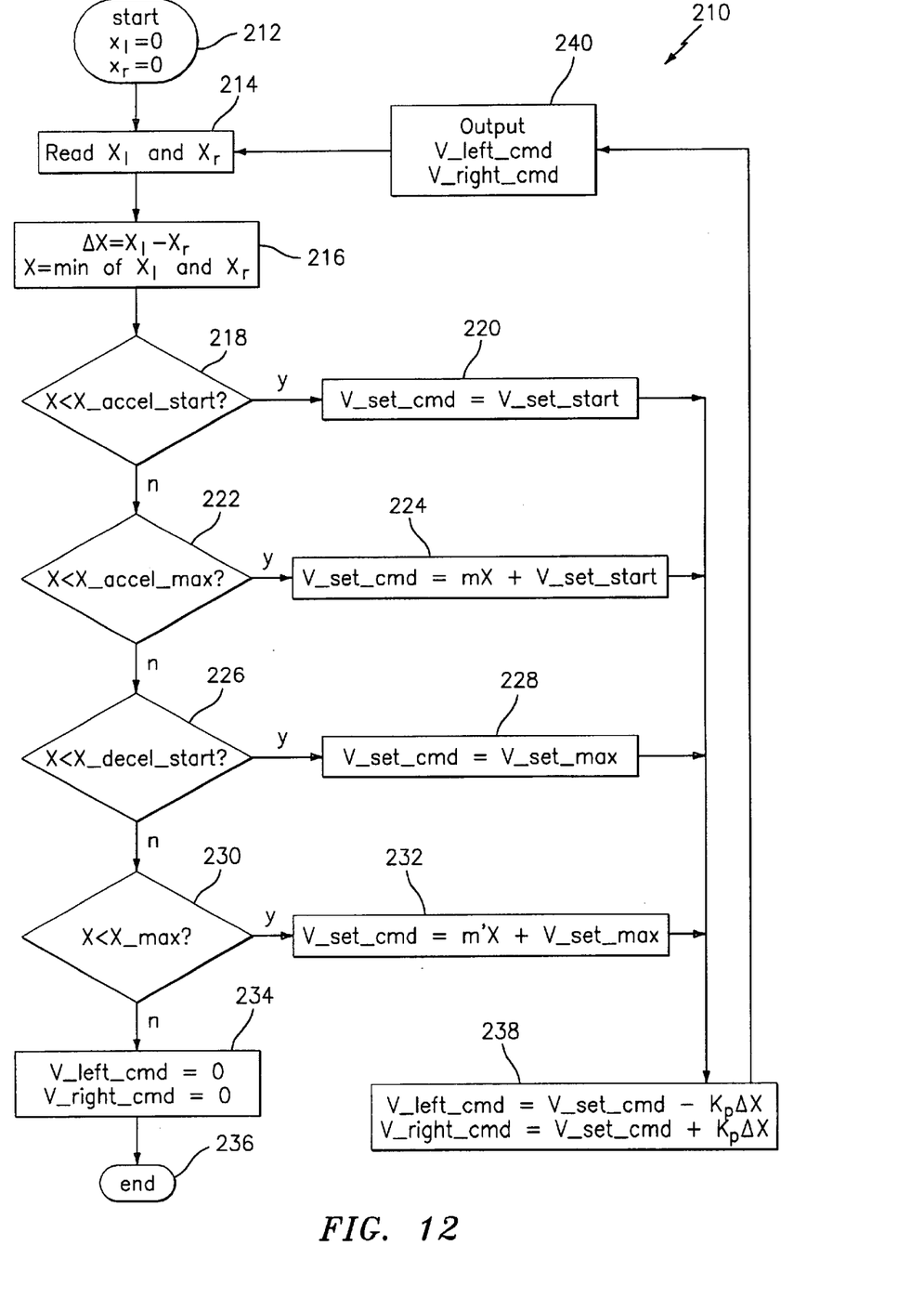
FIG. 12 is a flow chart depicting a method of controlling the bumper energy absorbers in response to position signals provided by the position sensors.

FIG. 12 is a flow chart depicting a method 210, which is employed by control logic 200 for calculating voltage (speed/torque) commands V_left_cmd and V_right_cmd for input to the left and right motor drivers 150 and 151, respectively. It will be recognized that this method may be implemented in an application-specific integrated circuit, microprocessor, general purpose computer, or the like. In addition, while the embodiment described herein employs a PM brushless motor, any other type of rotary or linear electric motor with a position sensor can be used with this method for symmetrical and noiseless actuation.

After the "Start" and direction "DIR" commands have been output to each of the motor drivers 150 and 151, method 210 starts at block 212, where the stored values indicating the distances Xl and Xr are reset to zero. Method 210 continues to block 214, where the distances Xl and Xr are read from the position counters 202 and 204 (FIG. 10), respectively. At block 216, the distance Xr is subtracted from Xl to determine the difference of travel between the ends 11 and 13 of the bumper structure 14. Also at block 216, a distance value X is set to the minimum of Xl and Xr. In block 218, the distance value X is compared to the minimum predetermined distance X_accel _start. If the distance value X is less than X_accel_start, the nominal set command level V_set_cmd is set to V_set_start at block 220. If the distance value X is greater than or equal to X_accel_start, method 210 continues to block 222 where X is compared to X_accel_max. If X is less than X_accel_max, V_set_cmd is set as a function of X in block 224:

$$V\_set\_cmd = mX + V\_accel\_start$$

where m is the slope from point (X_accel_start, V_set_start) to point (X_accel_max, V_set_max), as shown in FIG. 11. While the ramping of V_set_cmd is shown here to be linear, other functions to ramp V_set_cmd from V_set_start to V_set_max may be used as well. If, in block 222, X is greater than or equal to X_accel_max, then method 210 continues to block 226, where X is compared to X_decel_start. If X is less than X_decel_start, V_set_cmd is set to V_set_max in block 228. If X is greater than or equal to X_decel_start, method 210 continues to block 230 where X is compared to X_max. If X less than X_max, indicating that the actuators 20 are near the end of travel, V_set_cmd is set as a function of X in block 232:

$$V\_set\_cmd = m'X + V\_set\_max$$

where m' is the slope from point (X_decel_start, V_set_max) to point (X_max, V_set_end), as shown in FIG. 11. While the decrease of V_set_cmd is shown here to be linear, other functions to decrease V_set_cmd from V_set_max to V_set_end may be used as well. If, at block 230, X is greater than or equal to X_max, the actuators 20 have both reached the end of travel, and method 210 continues to block 234 where V_left_cmd and V_right_cmd are set to zero, stopping the actuators. Method 210 then ends at block 236. From any of blocks 220, 224, 228, or 232, after V_set_cmd has been determined, V_left_cmd is calculated by subtracting the voltage differential, Kp X, from V_set_cmd, and V_right_cmd is calculated by adding the voltage differential Kp X to V_set_cmd at block 238. As previously noted, Kp may be replaced by a more complex control function. After V_left_cmd and V_right_cmd are calculated, they are output to the left and right motor drivers, respectively, at block 240. From block 240, method 210 continues to block 214, where the next distance values Xl and Xr from the counters 202 and 204 are read. Method 210 continues until the actuators 20 reach the end of travel at block 230.

The extendible bumper system described herein employs linear actuators, which use a coaxial, direct drive electric motor in line with the extendable tube. This arrangement provides a fast and effective means of extending or retracting the bumper of a vehicle, while requiring less volume than that previously achievable with actuators of the prior art. The motor includes an integrated position sensor that allows a controller system to control the actuators in the bumper energy absorbers. The method employed by controller system ensures symmetrical extension or retraction on both ends of the bumper structure. The method employed by the controller system also allows for gradual acceleration and deceleration of the motors, actuators, and bumper structure to eliminate the noise and vibration associated with the abrupt extension and retraction of the bumper structure.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An extendible bumper system for a vehicle, the extendible bumper system comprising:
    a bumper structure;
    a first motor including:
        a first rotor mechanically coupled to a first end of the bumper structure for driving the first end of the bumper structure between extended and retracted positions, and
        a first position sensor configured to sense a rotational position of the first rotor and output a first signal indicative of the rotational position of the first rotor;
    a second motor including:
        a second rotor mechanically coupled to a second end of the bumper structure for driving the second end of the bumper structure between extended and retracted positions, and
        a second position sensor configured to sense a rotational position of the second rotor and output a second signal indicative of the rotational position of the second rotor; and a controller system configured to determine a distance of travel of the first end of the bumper structure using the first signal, determine a distance of travel of the second end of the bumper structure using the second signal, and independently adjust at least one of rotational speed and torque output of the first and second rotors in response to the distance of travel of the first end of the bumper structure and the distance of travel of the second end of the bumper structure.

2. The extendible bumper system of claim 1, wherein the controller system independently adjusts at least one of rotational speed and torque output of the first and second rotors in response to a difference in the distances of travel of the first and second ends of the bumper structure.

3. The extendible bumper system of claim 1, wherein the controller system accelerates rotation of the first rotor during a predetermined distance of travel of the first end of the bumper structure, and accelerates rotation of the second rotor during a predetermined distance of travel of the second end of the bumper structure.

4. The extendible bumper system of claim 1, wherein the controller system decelerates rotation of the first rotor during a predetermined distance of travel of the first end of the bumper structure, and decelerates rotation of the second rotor during a predetermined distance of travel of the second end of the bumper structure.

5. The extendible bumper system of claim 1, wherein the controller system stops rotation of the first and second rotors after the first and second ends of the bumper structure have each traveled a predetermined distance.

6. The extendible bumper system of claim 1, wherein the controller system is configured to:
   subtract the distance of travel of the first end of the bumper structure from the distance of travel of the second end of the bumper structure to determine a difference;
   determine a voltage differential as a function of the difference;
   determine a nominal set point voltage for the first and second motors;
   add the voltage differential to the nominal set point voltage to determine a voltage command for the first motor; and
   subtract the voltage differential from the nominal set point voltage to determine a voltage command for the second motor.

7. The extendible bumper system of claim 6, wherein the voltage differential is determined by multiplying the difference by a compensation gain.

8. The extendible bumper system of claim 6, wherein the nominal set point voltage for the first and second motors is a function of the minimum of the distance of travel of the first end of the bumper structure and the distance of travel of the second end of the bumper structure.

9. The extendible bumper system of claim 8, wherein the nominal set point voltage is constant over a first predetermined distance of travel, increasing as a function of the minimum of the distance of travel of the first end of the bumper structure and the distance of travel of the second end of the bumper structure over a second predetermined distance of travel, and decreasing as a function of the minimum of the distance of travel of the first end of the bumper structure and the distance of travel of the second end of the bumper structure over a third predetermined distance of travel.

10. The extendible bumper system of claim 1, wherein the first rotor is mechanically coupled to the bumper structure by an actuator, the actuator including:

a lead screw coupled to the first rotor; and
a nut threadably engaged with the lead screw and coupled to the bumper structure, wherein rotation of the lead screw by the first rotor causes translation of the nut along the lead screw for driving the first end of the bumper structure between the extended and retracted positions.

11. The extendible bumper system of claim 10, wherein the controller system counts a number of edges in the first signal to determine a number of revolutions of the rotor and multiplies the number of revolutions by a thread pitch of the lead screw to determine the distance of travel of the first end of the bumper structure.

12. The extendible bumper system of claim 10, further comprising:
   an outer tube coupled to the vehicle; and
   an inner tube disposed within the outer tube and having an end coupled to the bumper structure, the lead screw being disposed within the inner tube, the inner tube being coupled to the nut.

13. The extendible bumper system of claim 12, further comprising:
   a self-locking mechanism disposed between the inner tube and the outer tube, the self-locking mechanism providing a mechanical resistance between the inner tube and the outer tube in response to a force applied to the bumper structure.

14. A method of controlling an extendible bumper system, the extendible bumper system including a first motor for driving a first side of a bumper structure between extended and retracted positions and a second motor for driving a second side of the bumper structure between extended and retracted positions, the method comprising:
   sensing a rotational position of a first rotor in the first motor;
   in response to the sensed position of the first rotor, determining a distance of travel of the first end of the bumper structure;
   sensing a rotational position of a second rotor in the second motor;
   in response to the sensed position of the second rotor, determining a distance of travel of a second end of the bumper structure; and
   independently adjusting at least one of rotational speed and torque output of the first and second rotors in response to the distance of travel of the first end of the bumper structure and the distance of travel of the second end of the bumper structure.

15. The method of claim 14, wherein the independently adjusting includes:
   independently adjusting the at least one of rotational speed and torque output of the first and second rotors in response to a difference in the distances of travel of the first and second ends of the bumper structure.

16. The method of claim 14, wherein the independently adjusting includes:
   accelerating rotation of the first rotor during a predetermined distance of travel of the first end of the bumper structure; and
   accelerating rotation of the second rotor during a predetermined distance of travel of the second end of the bumper structure.

17. The method of claim 14, wherein the independently adjusting includes:
   decelerating rotation of the first rotor during a predetermined distance of travel of the first end of the bumper structure; and decelerating rotation of the second rotor during a predetermined distance of travel of the second end of the bumper structure.

18. The method of claim 14, wherein the independently adjusting includes:

subtracting the distance of travel of the first end of the bumper structure from the distance of travel of the second end of the bumper structure to determine a difference;

determining a voltage differential as a function of the difference;

determining a nominal set point voltage for the first and second motors;

adding the voltage differential to the nominal set point voltage to determine a voltage command for the first motor; and subtracting the voltage differential from the nominal set point voltage to determine a voltage command for the second motor.

19. The extendible bumper system of claim 18, wherein the voltage differential is determined by multiplying the difference by a compensation gain.

20. The extendible bumper system of claim 18, wherein the nominal set point voltage for the first and second motors is a function of the minimum of the distance of travel of the first end of the bumper structure and the distance of travel of the second end of the bumper structure.

21. The extendible bumper system of claim 20, wherein the nominal set point voltage is constant over a first predetermined distance of travel, increasing as a function of the minimum of the distance of travel of the first end of the bumper structure and the distance of travel of the second end of the bumper structure over a second predetermined distance of travel, and decreasing as a function of the minimum of the distance of travel of the first end of the bumper structure and the distance of travel of the second end of the bumper structure over a third predetermined distance of travel.

22. A bumper energy absorber for supporting a bumper structure relative to a vehicle, the bumper energy absorber comprising:

an outer tube coupled to the vehicle;

an inner tube disposed within the outer tube and having an end coupled to the bumper structure;

a lead screw disposed within the inner tube;

a nut threadably engaged to the lead screw, the inner tube being coupled to the nut;

a motor including:
a stator fixed relative to the outer tube, and
a rotor coupled to the lead screw, wherein rotation of the lead screw by the rotor causes translation of the nut along the lead screw for driving at least a portion of the bumper structure between extended and retracted positions.

23. The bumper energy absorber of claim 22, further comprising:

a self-locking mechanism disposed between the inner tube and the outer tube, the self-locking mechanism providing a mechanical resistance between the inner tube and the outer tube in response to a force applied to the bumper structure.

24. The bumper energy absorber of claim 22, further comprising:

a position sensor configured to sense a rotational position of the rotor and output a signal indicative of the rotational position of the rotor.

25. The bumper energy absorber of claim 22, wherein the outer tube, the inner tube, the lead screw, and the rotor are positioned along a common longitudinal axis.

26. The bumper energy absorber of claim 25, wherein the rotor is a hollow rotor and the lead screw extends through the hollow rotor.

27. The bumper energy absorber of claim 22, wherein the outer tube is secured within a hollow frame rail of the vehicle.

* * * * *